United States Patent [19]
Spencer, II et al.

[11] Patent Number: 5,991,692
[45] Date of Patent: *Nov. 23, 1999

[54] ZERO MOTION DETECTION SYSTEM FOR IMPROVED VEHICLE NAVIGATION SYSTEM

[75] Inventors: Larry E. Spencer, II, Lake Orion; Steven R. Croyle, Franklin, both of Mich.

[73] Assignee: Magellan DIS, Inc., Rochester Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/579,903

[22] Filed: Dec. 28, 1995

[51] Int. Cl.$^6$ ........................................... G06G 7/78
[52] U.S. Cl. ..................... 701/217; 701/213; 701/221; 73/178 R
[58] Field of Search ..................... 364/460, 461, 364/450, 454, 443, 444.1, 449.1, 449.2, 449.3, 447.7, 453, 448, 447; 340/988, 990, 995; 73/178 R, 514.02, 514.17, 514.39; 342/357, 352, 457, 451, 461; 701/216, 215, 207, 208, 213, 200, 217, 203

[56] References Cited

U.S. PATENT DOCUMENTS

| | | | |
|---|---|---|---|
| 3,749,893 | 7/1973 | Hileman | 235/150.27 |
| 3,789,198 | 1/1974 | Henson et al. | 235/150.27 |
| 3,845,289 | 10/1974 | French | 235/151.2 |
| 3,984,806 | 10/1976 | Tyler | 340/23 |
| 4,032,758 | 6/1977 | Lewis | 235/150.2 |
| 4,086,632 | 4/1978 | Lions | 364/444 |
| 4,107,689 | 8/1978 | Jellinek | 343/112 TC |
| 4,253,150 | 2/1981 | Scovill | 364/449 |
| 4,254,465 | 3/1981 | Land | 364/453 |
| 4,301,506 | 11/1981 | Turco | 364/436 |
| 4,312,577 | 1/1982 | Fitzgerald | 353/12 |
| 4,351,027 | 9/1982 | Gay et al. | 364/432 |
| 4,369,441 | 1/1983 | Wohlmuth | 340/733 |

(List continued on next page.)

FOREIGN PATENT DOCUMENTS

| | | |
|---|---|---|
| 0 059 435 | 9/1982 | European Pat. Off. . |
| 0 061 564 1 | 10/1982 | European Pat. Off. . |
| 0 069 965 | 1/1983 | European Pat. Off. . |
| 0 103 847 | 3/1984 | European Pat. Off. . |
| 0110 171 | 6/1984 | European Pat. Off. . |
| 0 118 886 | 9/1984 | European Pat. Off. . |
| 0181012 | 8/1985 | European Pat. Off. . |
| 0488594 | 11/1991 | European Pat. Off. . |

OTHER PUBLICATIONS

"Integration of GPS and Dead–Reckoning Navigation Systems" published Jan. 10, 1991, by Wei–Wen Kao, Technolgy and Information Div. ZEXEL USA Corp. Sunnyvale, California.

(List continued on next page.)

Primary Examiner—Jacques H. Louis-Jacques
Attorney, Agent, or Firm—Howard & Howard

[57] ABSTRACT

The improved vehicle navigation system and method uses information from a Global Positioning System (GPS) to obtain velocity vectors, which include speed and heading components, for propagating or "dead reckoning" the vehicle position from a previous position to a current position. The improved vehicle navigation system has a GPS receiver which provides the GPS velocity information which is calculated from a full set of GPS delta range measurements. GPS position data alone is not accurate enough for certain applications, such as turn-by-turn route guidance in automobile applications, because its error may be 100 m and there is considerable position drift, even when stationary. GPS velocities are much more accurate than the position data, 1 m/s or thereabouts, and can be used to propagate a known position forward and be more accurate over time than the GPS position solution. These velocities are instantaneous and not those computed from differencing two positions. The current position is calculated by adding displacements obtained from the GPS velocities to the previous position.

17 Claims, 9 Drawing Sheets

U.S. PATENT DOCUMENTS

| | | | |
|---|---|---|---|
| 4,403,291 | 9/1983 | Tomkewitsch | 364/424 |
| 4,504,913 | 3/1985 | Miura et al. | 364/449 |
| 4,513,377 | 4/1985 | Hasebe et al. | 364/449 |
| 4,528,552 | 7/1985 | Moriyama et al. | 340/525 |
| 4,543,572 | 9/1985 | Tanaka et al. | 340/723 |
| 4,546,439 | 10/1985 | Esparza | 364/444 |
| 4,570,227 | 2/1986 | Tachi et al. | 364/444 |
| 4,571,684 | 2/1986 | Takanabe et al. | 364/449 |
| 4,608,656 | 8/1986 | Tanaka et al. | 364/449 |
| 4,639,773 | 1/1987 | Hurst | 358/105 |
| 4,646,089 | 2/1987 | Takanabe et al. | 340/995 |
| 4,660,037 | 4/1987 | Nakamura | 340/990 |
| 4,675,676 | 6/1987 | Takanabe et al. | 340/995 |
| 4,711,125 | 12/1987 | Morrison | 73/178 R |
| 4,758,959 | 7/1988 | Thoone et al. | 364/454 |
| 4,796,191 | 1/1989 | Honey et al. | 364/450 |
| 4,814,989 | 3/1989 | Dobereiner et al. | 364/444 |
| 4,819,175 | 4/1989 | Wuttke | 364/449 |
| 4,847,769 | 7/1989 | Reeve | 364/424.02 |
| 4,890,104 | 12/1989 | Takanabe et al. | 340/995 |
| 4,899,285 | 2/1990 | Nakayama et al. | 364/453 |
| 4,903,212 | 2/1990 | Yokouchi et al. | 701/205 |
| 4,912,645 | 3/1990 | Kakihara et al. | 701/208 |
| 4,949,268 | 8/1990 | Nishikawa et al. | 364/449 |
| 4,954,833 | 9/1990 | Evans et al. | 342/357 |
| 4,989,151 | 1/1991 | Nuimura | 364/449 |
| 5,014,205 | 5/1991 | Sindlinger et al. | 364/449 |
| 5,023,798 | 6/1991 | Neukirchner et al. | 364/449 |
| 5,046,011 | 9/1991 | Kakihara et al. | 364/449 |
| 5,058,023 | 10/1991 | Kozikaro | 364/450 |
| 5,075,693 | 12/1991 | McMillan et al. | 342/457 |
| 5,109,344 | 4/1992 | Kakihara et al. | 364/449 |
| 5,111,209 | 5/1992 | Toriyama | 342/357 |
| 5,119,102 | 6/1992 | Barnard | 342/357 |
| 5,166,882 | 11/1992 | Stambaugh | 701/220 |
| 5,185,610 | 2/1993 | Ward et al. | 342/357 |
| 5,203,220 | 4/1993 | Lerman | 701/220 |
| 5,233,844 | 8/1993 | Mansell et al. | 342/357 |
| 5,276,451 | 1/1994 | Odagawa | 342/357 |
| 5,278,424 | 1/1994 | Kagawa | 250/561 |
| 5,311,195 | 5/1994 | Mathis et al. | 342/357 |
| 5,317,515 | 5/1994 | Matsuzaki | 701/221 |
| 5,331,563 | 7/1994 | Masumoto et al. | 701/207 |
| 5,337,243 | 8/1994 | Shibata et al. | 364/449 |
| 5,361,212 | 11/1994 | Class et al. | 701/300 |
| 5,367,463 | 11/1994 | Tsuji | 364/449 |
| 5,383,127 | 1/1995 | Shibata | 364/449 |
| 5,422,814 | 6/1995 | Sprage et al. | 701/213 |
| 5,469,158 | 11/1995 | Morita | 701/300 |
| 5,483,457 | 1/1996 | Shibata et al. | 701/221 |
| 5,485,161 | 1/1996 | Vaughn | 701/208 |
| 5,488,559 | 1/1996 | Seymour | 701/208 |
| 5,491,486 | 2/1996 | Welles, II et al. | 701/203 |
| 5,508,931 | 4/1996 | Snider | 701/207 |
| 5,523,765 | 6/1996 | Ichikawa | 701/213 |
| 5,525,998 | 6/1996 | Geier | 701/213 |
| 5,539,647 | 7/1996 | Shibata et al. | 701/221 |
| 5,583,776 | 12/1996 | Levi et al. | 701/217 |
| 5,594,453 | 1/1997 | Rodal et al. | 342/357 |
| 5,629,708 | 5/1997 | Rodal et al. | 342/357 |

FOREIGN PATENT DOCUMENTS

| | | |
|---|---|---|
| 0 471 405 | 2/1992 | European Pat. Off. . |
| 0 496 538 | 7/1992 | European Pat. Off. . |
| 0527558A1 | 7/1992 | European Pat. Off. . |
| 0 514 887 | 11/1992 | European Pat. Off. . |
| 0 544 403 | 6/1993 | European Pat. Off. . |
| 0 567 268 | 10/1993 | European Pat. Off. . |
| 3242904 A1 | 11/1982 | Germany . |
| 3912108 | 4/1989 | Germany . |
| 57-158875 | of 0000 | Japan . |
| 58-111969 | of 0000 | Japan . |
| 58-113711 | of 0000 | Japan . |
| 58-178213 | of 0000 | Japan . |
| 58-27008 | of 0000 | Japan . |
| 59-28244 | of 0000 | Japan . |
| 60-135817 | of 0000 | Japan . |
| 58-009017 | 1/1983 | Japan . |
| 1 470 694 | 4/1977 | United Kingdom . |
| 2 014 309 | 8/1979 | United Kingdom . |
| 2144 007 | 2/1985 | United Kingdom . |
| 2 115 946 | 9/1993 | United Kingdom . |
| WO 92/10824 | 6/1992 | WIPO . |

OTHER PUBLICATIONS

Brochure: Fleet–Trak: Fleet Management System.

McLellan, et al., Application of GPS Positioning to Management of Mobile Operations, pp. 1–16; 1991.

Stanley K. Honey; A Novel Approach to Automotive Navigation and Map Display, pp. 40–43.

Siemens, Ali–Scout System;.

G. C. Larson; Evaluation of an AVM System Implemented City–Wide in St. Louis. pp. 378–383.

Brochure: NavTrax 1000 Fleet Management System.

Lezniak, et al.; A Dead Reckoning/Map Correlation System for Automatic Vehicle Tracking; pp. 47–60.

May, 1973; Vehicular Technology; Antartic Navigation; pp. 36–41.

R. L. French; MAP Matching Origins Approaches and Applications; pp. 91–116.

Sep. 1974; R. L. Fey; Automatic Vehicle Location Techniques for Law Enforcement Use; pp. 1–22.

Tsumura, An Experimental System for Automatic Guidance of Ground Vehicle Following the Commanded Guidance Route on Map pp. 2425–2430.

Totani et. al.; Automotive Navigation System; pp. 469–477.

K. Mitamura et. al.; SAE Technical Paper Series; The Driver Guide System; pp. 1–9.

Thoone; Carin, a car information and navigation system; Philips Technical Review; vol. 43, No. 11/12, Dec. 1987; pp. 317–329.

T. Tsumura, et. al.; A System for Measuring Current Position and/or Heading of Vehicles; pp. 3–8.

Edward N. Skomal; Automatic Vehicle Locating Systems; pp. 1–12, 65–98, 319–320.

Agard; No. 176; Medium Accuracy Low Cost Navigation; pp. 28–1 to 28–31.

K. Tagami; et. al.; New Navigation Technology to Advance Utilization of Passenger Cars; pp. 413–422.

Tagami et. al.; SAE Technical Paper Series; "Electro Gyro–Cator" New Inertial Navigation System etc; pp. 1–15.

Agard; W. M. Aspin Comed—A Combined Display Including a Full Electronic Facility etc.; pp. 30–1 to 30–11.

Evans; Chrysler Laser Atlas Satellite System (C.L.A.S.S.).pp. 1–31.

R. L. French; The Evolution of Automobile Navigation, 1992, Arlington, Virginia.

R. L. French, et. al.; A Comparison of IVHS Progress in the United States, Japan and Europe.etc. Mar. 1994 pp. 17–22.

M. Shibita; et al; Current Status and Future Plans for Digital Map Databases in Japan; Oct. 1993 pp. 29–33.

Itoh, The Development of the Drive Guide System (japanese with English summary). 1989.

Business Week Magazine; Space–Age Navigation for the Family Car; pp. 82–84, 1984.

Journal: Nissan Technical Review; The Development of a New Multi–AV System, 1991.

Buxton, et al., The Travelpilot: A Second–Generation Automotive Navigation System, 1991.

Pilsak, Eva–An Electronic Traffic Pilot for Motorists, 1986.

French, The Evolving Roles of Vehicular Navigation, 1987, pp. 212, 216.

Claussen, et al.; Status and Directions of Digital Map Databases in Europe; 1993, pp. 25–28.

Jarvis, et al., Cathode–Ray Tube Information Center with Automotive Navigation, pp. 123–137.

Dork, Satellite Navigation Systems for Land Vehicles; 1987, pp. 2–5.

French, Automobile Navigation: Where is it Going? 1987, pp. 6–12.

LaHaije, et al., Efficient Road–Map Management for a Car Navigation System, pp. 477–491.

French, et al., Automatic Route Control System; 1973, pp. 36–41.

Tsumura, et al., Automatic Vehicle Guidance—Commanded Map Routing, pp. 62–67.

Sugie, et al., CARGuide—on–board computer for automobile route guidance, pp. 695–706.

McLellan, et al., Fleet Management Trials in Western Canada; pp. 797–806.

Skomal, Comparative Analysis of Six Commercially Available Systems; pp. 34–45.

Krause, et al. Veloc—A Vehicle Location and Fleet Management System.

Dittloff, et al., Veloc.—A New Kind of Information System; pp. 181–187; 1992.

Article: Vehicle Positioning High Level Map Matching Design Document; pp. 1–25; 195.

Brown, Low Cost Vehicle Location and Tracking using GPS; 1992.

ZERO MOTION DETECTION SYSTEM FOR IMPROVED VEHICLE NAVIGATION SYSTEM

FIELD OF THE INVENTION

The present invention relates generally to vehicle navigation systems. More particularly, the present invention relates to an improved vehicle navigation system and method for error reduction at low or no vehicle speed.

BACKGROUND OF THE INVENTION

The Navigation Satellite Timing and Ranging (NAVSTAR) GPS is a space-based satellite radio navigation system developed by the U.S. Department of Defense (DoD). GPS receivers provide land, marine, and airborne users with continuous three-dimensional position, velocity, and time data.

The GPS system consists of three major segments: Space, Control, and User as illustrated in FIG. 1. The space segment consists of a nominal constellation of 24 operational satellites which have been placed in 6 orbital planes above the Earth's surface. The satellites are in circular orbits in an orientation which normally provides a GPS user with a minimum of five satellites in view from any point on Earth at any one time.

Each satellite continuously broadcasts navigation data. This navigation data, which is computed and controlled by the GPS Control Segment, includes the satellite's time, its clock correction and ephemeris parameters, almanacs, and health status for all GPS satellites. From this information, the user computes the satellite's precise position and clock offset.

The controlling segment consists of a Master Control Station and a number of monitor stations at various locations around the world. Each monitor station tracks all the GPS satellites in view and passes the signal measurement data back to the Master Control Station. There, computations are performed to determine precise satellite ephemeris and satellite clock errors. The Master Control Station generates the upload of user navigation data from each satellite. This data is subsequently rebroadcast by the satellite as part of its navigation data message.

The user segment is the collection of all GPS receivers and their application support equipment such as antennas and processors. This equipment allows users to receive, decode, and process the information necessary to obtain accurate position, velocity, and timing measurements.

GPS based position solutions are inherently poor under low vehicle dynamics. Some current systems use a hard wired speed signal or odometer input to help correct or calibrate distance errors under low or zero speed conditions. This hard wired approach increases the overall system cost, requires specialized knowledge of the vehicle's wiring system, and requires a specialized wiring harness to interface to each individual automobile. In addition, certain systems require a calibration procedure to determine the zero offset of the motion sensor. For example, in a system using a compass or gyro, the user must press a calibration button and drive in a circle and come to a stop for a minimum period of time to determine zero offsets for those devices. Using the road network of a map database, if a vehicle is travelling on a straight path, the system can calculate the zero offset for the gyro. Odometers were previously used for zero motion but are generally ambiguous below 3 mph and also required hard wiring. Other systems require a rotational sensor to determine a vehicle's change in heading under these low dynamic or other unfavorable GPS conditions.

Accordingly, there is a need for an improved vehicle navigation system which can more accurately, efficiently and cost-effectively reduce errors in the position determination at low or no speeds than current vehicle navigation systems.

SUMMARY OF THE INVENTION

The zero motion detection system for an improved vehicle navigation system can take advantage of the recent availability of low cost micro-machined and piezoelectric sensors, and partially overcomes the low dynamics and line of sight limitations of GPS receivers without resorting to the hard wired approach described above. The sensors introduce system level errors due to their inherent DC offset and drift rates. The improved vehicle navigation system minimizes both the sensor induced errors and GPS low dynamic limitations by using a zero motion detection system as a self contained (within the navigation system), vehicle independent device. The zero motion detection system allows recalibration of zero offsets at every zero motion state, and provides a true zero velocity indicator. Furthermore, the system enhances portability by eliminating the need for the hard-wired approach.

In certain embodiments, the sensors described above provide an analog output proportional to either acceleration (micro-machined accelerometer), or rate of rotation (piezoelectric gyro) with a DC offset voltage. This offset voltage greatly affects the accuracy of the measurement. This offset voltage is also affected by temperature, vehicle load, and physical mounting of device in relation to the vehicle. By measuring and detecting the amplitude of vibrations, and comparing this amplitude to a pre-defined threshold, the improved vehicle navigation system can determine that a vehicle is either in motion or at rest.

If the vehicle is at rest, the improved vehicle navigation system averages the sensor's readings to use as the DC offset voltage for this sensor. The improved vehicle navigation system passes a zero motion signal to the GPS based positioning engine that indicates a zero motion state. The positioning engine can use this information to lock heading changes and calibrate velocity measurements. When the vehicle is determined to be in motion again, the improved vehicle navigation system locks the DC offset measurement gathered during the zero motion state, and the positioning engine is released to update changes in heading and velocity.

Thus, the improved vehicle navigation system eliminates the "wandering" effect of the GPS position while the vehicle is at rest. This also allows the improved vehicle navigation system to use less expensive amplifier/sensor combinations in high performance navigation systems.

BRIEF DESCRIPTION OF THE DRAWINGS

Other aspects and advantages of the present invention may become apparent upon reading the following detailed description and upon reference to the drawings in which:

FIG. 4b shows a flow chart for the operation of the zero motion detect system of FIG. 4a;

Figure 1:
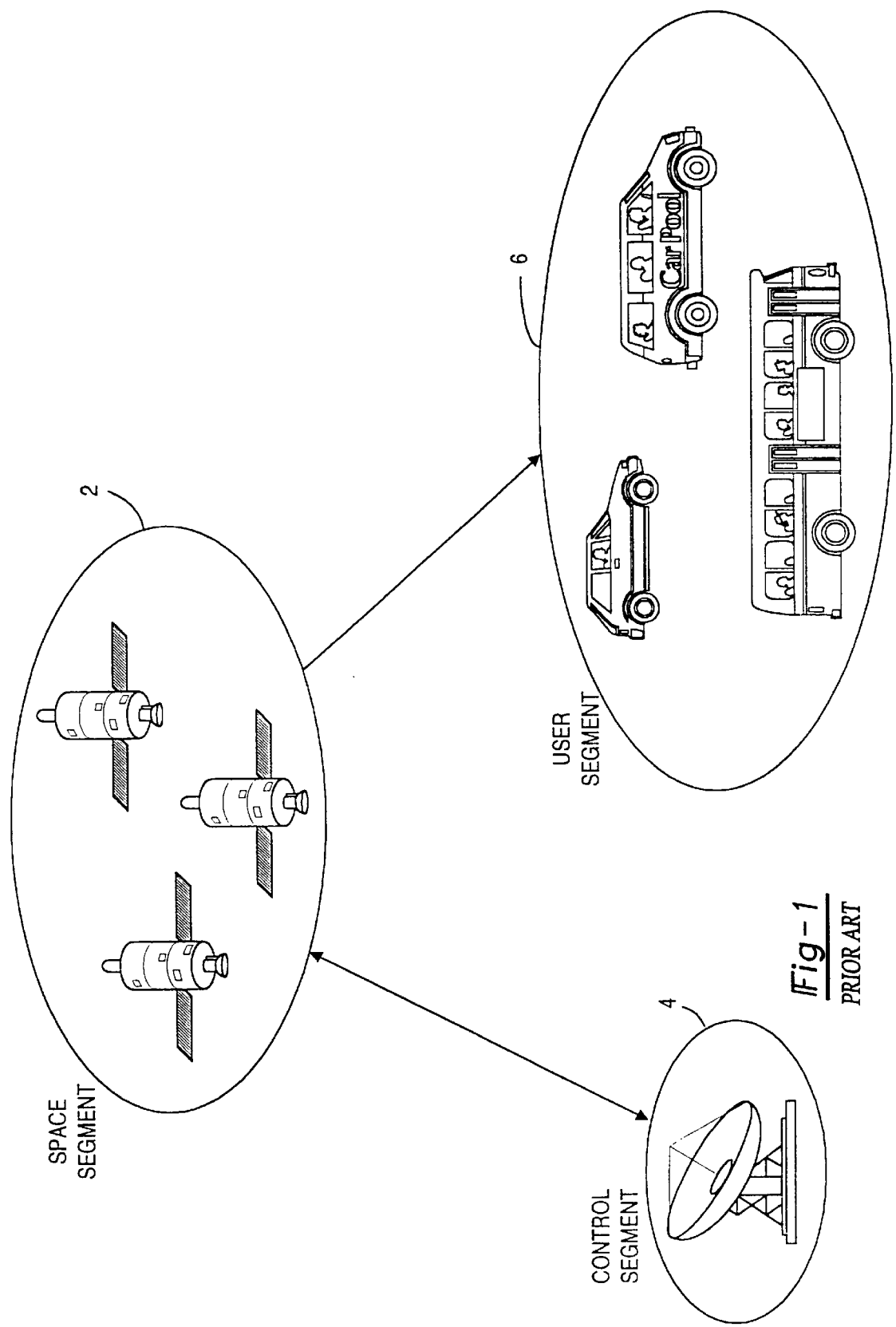
FIG. 1 is a general illustration of the various segments in the NAVSTAR GPS system.

While the invention is susceptible to various modifications and alterative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION OF THE DRAWINGS

An illustrative embodiment of the improved position determination system according to the principles of the present invention and methodology is described below as it might be implemented using a zero motion detection signal providing a zero motion signal to reduce errors in GPS position determinations and sensors. In the interest of clarity, not all features of an actual implementation are described in this specification. It will of course be appreciated that in the development of any such actual implementation (as in any development project), numerous implementation-specific decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

Aspects of the improved vehicle navigation system has application in connection with a variety of system configurations. Such a vehicle navigation system is disclosed in copending patent application Ser. No. XX/XXX,XXX, entitled "Improved Vehicle Navigation System And Method" filed concurrently with this application. Other configurations are possible as would be understood by one of ordinary skill in the art.

Figure 2:
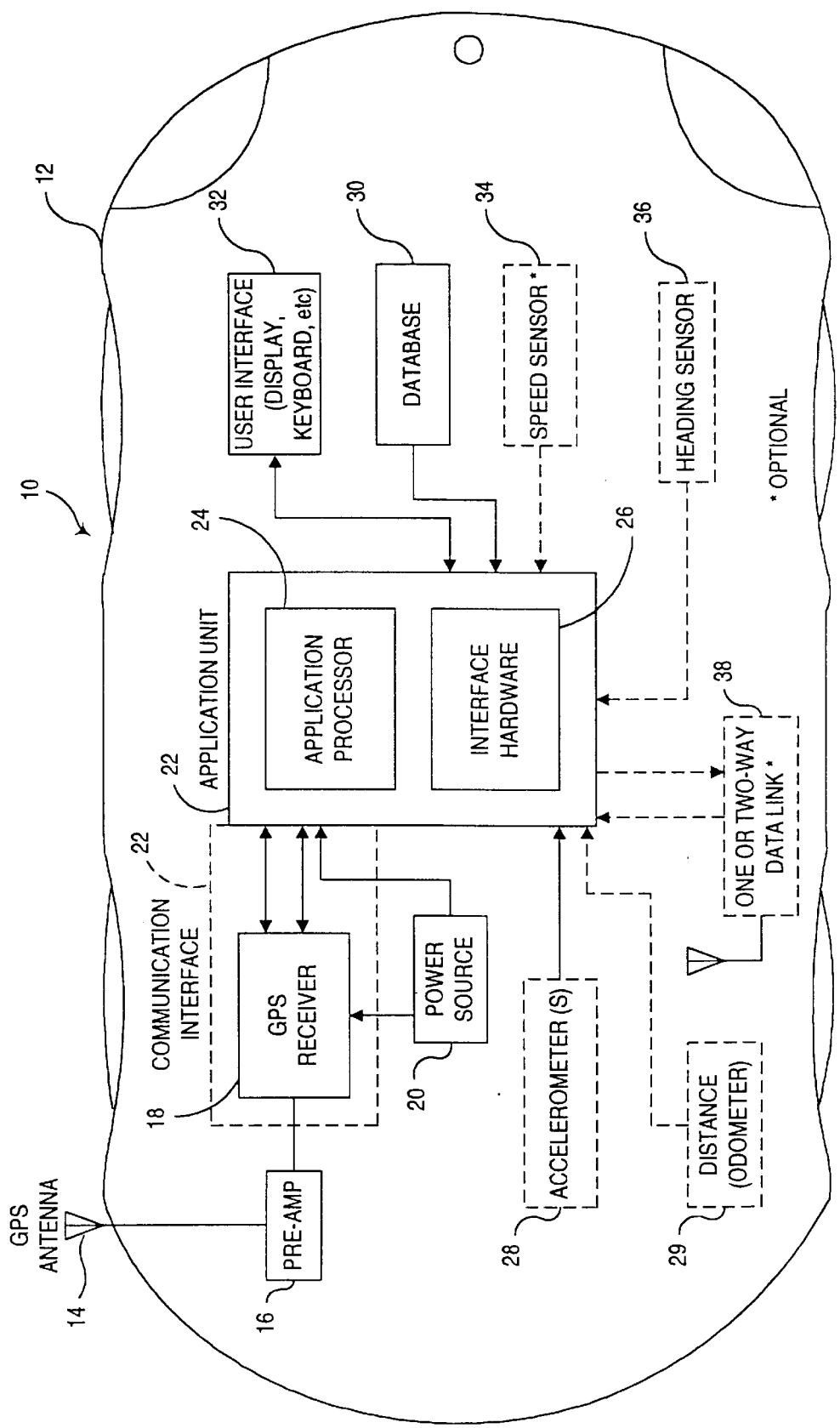
FIG. 2 shows variations of an improved vehicle navigation system according to the principles of the present invention.

FIG. 2 illustrates, in block diagram form, exemplary arrangements of an improved vehicle navigation system 10 for an automobile 12. In this embodiment, the improved vehicle navigation system uses GPS signals for position determination. As such, the improved vehicle navigation system 10 uses a GPS antenna 14 to receive the GPS signals. The antenna 14 is preferably of right-hand circular polarization, has a gain minimum of −3 dBiC above 5 degree elevation, and has a gain maximum of +6 dBiC. Patch or Helix antennas matching these specifications can be used. The GPS antenna 14 can be connected to a preamplifier 16 to amplify the GPS signals received by the antenna 14. The pre-amplifier 16 is optional, and the GPS antenna can be directly connected to a GPS receiver 16.

The GPS receiver 18 continuously determines geographic position by measuring the ranges (the distance between a satellite with known coordinates in space and the receiver's antenna) of several satellites and computing the geometric intersection of these ranges. To determine a range, the receiver 18 measures the time required for the GPS signal to travel from the satellite to the receiver antenna. The timing code generated by each satellite is compared to an identical code generated by the receiver 18. The receiver's code is shifted until it matches the satellite's code. The resulting time shift is multiplied by the speed of light to arrive at the apparent range measurement.

Since the resulting range measurement contains propagation delays due to atmospheric effects, and satellite and receiver clock errors, it is referred to as a "pseudorange." Changes in each of these pseudoranges over a short period of time are also measured and processed by the receiver 18. These measurements, referred to as delta range measurements or "delta-pseudoranges," are used to compute velocity. Delta ranges are in meters per second which are calculated by the receiver from pseudoranges, and the GPS receiver 18 can track the carrier phase of the GPS signals to smooth out the psuedoranges. The velocity and time data is generally computed once a second. If one of the position components is known, such as altitude, only three satellite pseudorange measurements are needed for the receiver 16 to determine its velocity and time. In this case, only three satellites need to be tracked.

As shown in FIG. 2, the GPS receiver 18 provides GPS measurements to an application unit 22. The application unit 22 consists of application processing circuitry 24, such as a processor, memory, busses, the application software and related circuitry, and interface hardware 26. In one embodiment of the present invention, the application unit 22 can be incorporated into the GPS receiver 18. The interface hardware 26 integrates the various components of the vehicle navigation system 10 with the application unit 22.

The system 10 can include a combination of the features, such as those shown in dashed lines. For example, the improved vehicle navigation system could rely upon information provided by the GPS receiver 18, an accelerometer 28 (which in certain embodiments is an orthogonal axes accelerometer) and the map database 30 to propagate vehicle position. In additional embodiments, the improved vehicle navigation system 10 uses the accelerometer 28, an odometer 29 and a map database 30 according to other aspects of the present invention. Other embodiments can include a speed sensor 34, a heading sensor 36, such as a gyro, compass or differential odometer, and a one or two way communication link 38. Other configurations and combinations are possible which incorporate aspects of the present invention as would be understood by one of ordinary skill in the art. Moreover, the improved vehicle navigation system can be incorporated in an advanced driver information system which controls and provides information on a variety of automobile functions.

Figure 3:
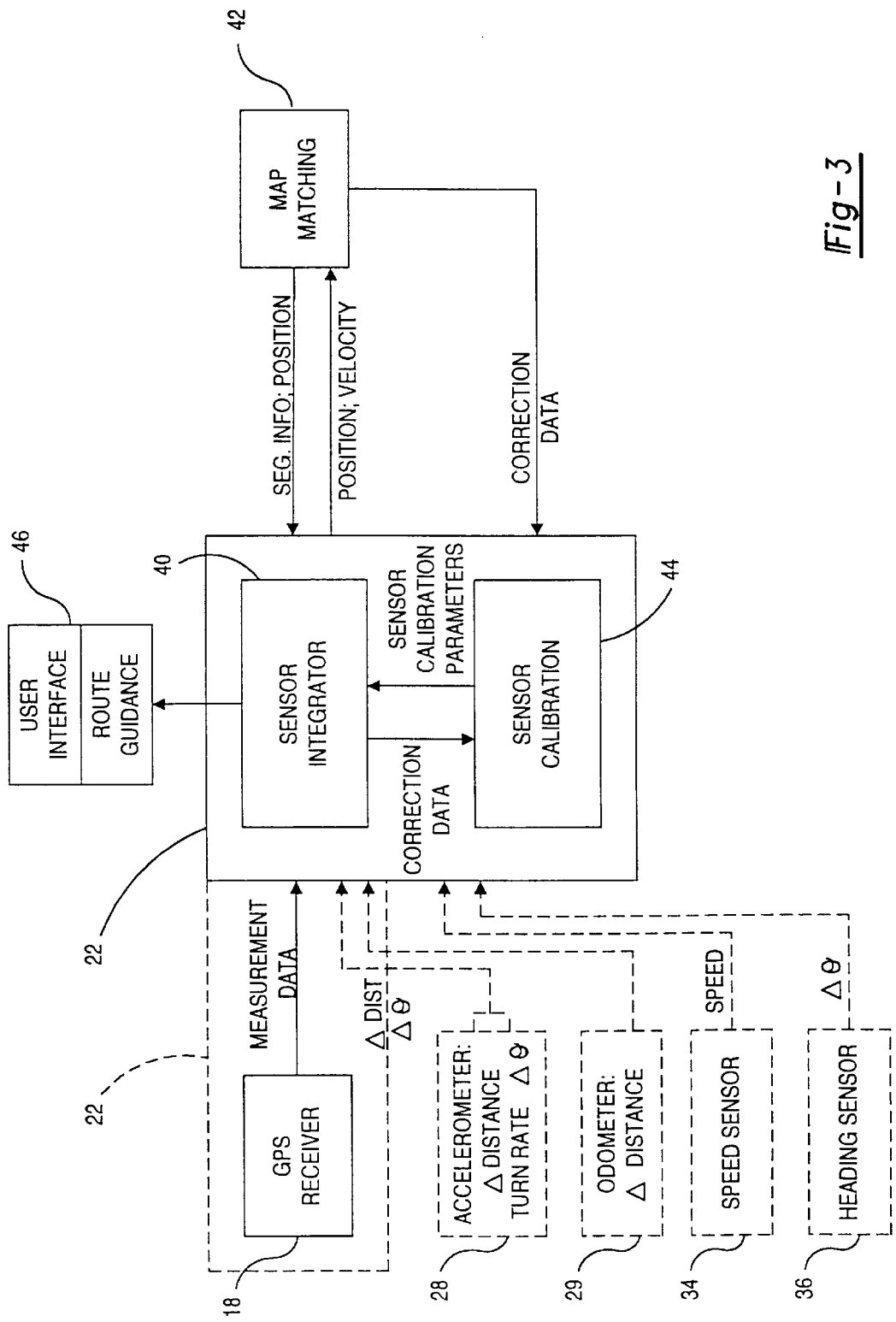
FIG. 3 shows a block/data flow diagram of a version of the improved vehicle navigation system of FIG. 2.

FIG. 3 shows a block and data flow diagram for the improved vehicle navigation system 10 which reveals the flexibility and accuracy of certain embodiments of the improved vehicle navigation system. The GPS receiver 18 provides position information, velocity information, psuedoranges and delta pseudoranges to the sensor integrator 40. The sensor integrator 40 uses the velocity information to determine a current position for the vehicle. In this embodiment, if GPS velocity information is not available, the sensor integrator 40 can calculate GPS velocity using the available delta range measurements to determine a current position. GPS velocity information is derived from a set of delta range measurements, and if only a subset of delta range measurements is available, the vehicle navigation system can derive GPS velocity information from the subset of delta range measurements. The vehicle navigation system uses the GPS position information at start-up as a current position and as a check against the current position. If the current position fails the check, then the GPS position can replace the current position.

If GPS velocity information is not available, certain embodiments can obtain the information used to propagate the vehicle position from the sensors. The sensor 28, which is a multiple axis accelerometer, provides acceleration information for at least two orthogonal axes (lateral, longitudinal and/or vertical) to the application unit 22. The odometer 29 provides information which can be used in place of the information derived from the accelerometers. Other available information can include the odometer distance and GPS heading, a distance calculation and map heading, the GPS speed information and map heading, gyro heading and longitudinal speed and other variations.

A map database 30 stores map information, such as a road network, and provides map information to the application unit 22. The map database should have some level of known accuracy, confidence, or defined error. In this embodiment, every change in street segment heading is designated as a shape point which has a heading with a fixed measurement error. A user interface 32, which includes a display and keyboard, allows interaction between the user and the improved vehicle navigation system 10. In this embodiment, if the difference between the current heading and map heading is less than a threshold value, then the map heading is used as the heading. Vehicle positioning 22 calibrates $\overline{v}_a$ from $\overline{v}_G$ when possible. The GPS position information is used as an overall check on the current position. For example, if $|\overline{x}(t)-\overline{x}_G(t)|<(18.5>* \text{ PDOP})$, then $\overline{x}(t)=\overline{x}(t)$. Otherwise, $\overline{x}(t)=\overline{x}_G(t)$. In certain embodiments, all raw inputs could go into a Kalman filter arrangement which outputs the velocity vector.

In any event, if GPS is available or not, the sensor integrator 40 provides the current position and a velocity (speed and heading) to a map matching block 42. The map matching block 42 provides road segment information for the road segment that the vehicle is determined to be travelling on, such as heading, and a suggested position. The sensor integrator 40 can update the heading component of the velocity information with the heading provided by the map matching block 42 to update the current position. If the map matching block 42 indicates a good match, then the map matched position can replace the current position. If not, the sensor integrator propagates the previous position to the current position using the velocity information. As such, the sensor integrator 40 determines the current position and provides the current position to a user interface and/or route guidance block 46.

The map matching block 42 also provides correction data, such as a distance scale factor and/or offset and a turn rate scale factor and/or offset, to a sensor calibration block 44. The sensor integrator 40 also provides correction data to the sensor calibration block 44. The correction data from the sensor integrator 40, however, is based on the GPS information. Thus, accurate correction data based on the GPS information is continuously available to calibrate the sensors 28 (2 or 3 axis accelerometer) as well as for other sensors 29, 34 and 36 depending on the particular embodiment. The correction data from the map matching block may be ignored by the sensor calibration block 44 until a good match is found between the map information and the current position. If a highly accurate match is found by map matching 42, most likely after a significant maneuver such as a change in direction, the map matched position is used as a reference point or starting position for position propagation according to the principles of the present invention.

The sensor calibration block 44 contains the sensor calibration parameters, such as scale factors and zero factors for the sensors 28 and 29 and provides the calibration parameters to the sensor integrator 40 to calibrate the sensors 28–36. In one embodiment, the system can combine the sensor integrator 40 and sensor calibration 44 into GPS engine 18 using its processor. In certain embodiments, the route guidance and user interface, the sensor integrator 40 and the sensor calibration 44 is performed on an application specific integrated circuit (ASIC).

If the accuracy of a current position is determined to be high (for example, a map matched position at a isolated turn), the improved vehicle navigation system 10 can update the current position with the known position. After the vehicle has moved a distance from the known position which is now a previous position, the improved vehicle navigation system must accurately propagate the vehicle position from the previous position to the current position.

In a particular embodiment of the improved navigation system of FIG. 2 using zero motion detection, a GPS receiver 18, an orthogonal axes accelerometer 28 and an odometer 29, the calculations that will be performed to compute the vehicle position will take place in three coordinate frames. The vehicle position will be reported in geodetic coordinates (latitude, longitude, altitude). The non-GPS data will be provided in body or platform coordinates. The GPS velocities and the equations used for velocity propagation of position will take place in the North, East, Down frame.

The geodetic frame is a representation of the Earth Centered Earth Fixed (ECEF) coordinates that is based on spherical trigonometry. This is the coordinate frame that the mapping database uses. Its units are degrees and meters displacement in height above the geoid. These coordinates will be with respect to the WGS-84 Earth model, which is the Earth model used by the Global Positioning System (GPS). This is mathematically equivalent to the North American Datum 1983 (NAD 83) system which the mapping database is referenced to. The North East Down frame is a right-handed orthonormal coordinate system fixed to the vehicle with its axes pointing to the True North, True East, and True Down (perpendicular to the Earth) directions. The body coordinates form a right-handed orthonormal coordinate system with their origin at the navigation unit, the x axis pointing toward the nose of the vehicle, the right axis pointing out the right door of the vehicle and the z axis pointing down perpendicular to the Earth.

During normal operation of a particular embodiment of the system (with an odometer and orthogonal axes accelerometer), and with GPS information available, the following are the equations that will be used for computing the vehicle position and the calibration of the accelerometers and odometer.

Definitions:

$\overline{x}$=position vector [latitude longitude altitude]

$\dot{\overline{x}}$=velocity vector [north east down]

$\ddot{\overline{x}}$=acceleration vector [north east down]

$C_N^B$=Transformation matrix which rotates a vector from the Body coordinate frame to the North East Down coordinate frame.

The following superscripts will be used to denote the origin of the data:

G=GPS

A=Accelerometer

O=Odometer

The following subscripts will denote time - either time of validity or time period of integration:

t=current time
t−1=time of last data set before the current data set
t−2=time of data set before t−1
Note that t−1 and t−2 do not necessarily imply a one second difference, but only data collection and/or data validity times.
The following subscripts will denote coordinate reference frames:
N=North East Down
B=Body (Nose Right Door Down)
G=Geodetic (latitude longitude height)
To use the information from the non-GPS sensors, their data needs to be rotated from the body frame to the North East Down frame. This is a rotation about the yaw axis measured in degrees from True North to the Nose Axis of the vehicle. The equations for this is:

$$\vec{x}^N = C_N^B (\vec{x}^B)$$

The steady state position propagation equation is based on the physical definition of velocity and acceleration. The current position is equal to the previous position plus the integral of velocity plus the double integral of acceleration.

$$\vec{x}_t = \vec{x}_{t-1} + \int_{t-1}^{t} \dot{\vec{x}} dt + \int_{t-1}^{t} \left( \int_{t-1}^{t} \ddot{\vec{x}} dt \right) dt$$

The following information is collected at time t:

$$\dot{\vec{x}}_{t-1}^G$$

The velocity from GPS which was valid at the previous second. This consists of:
$\dot{x}^e$=Velocity in the True East direction (meters/second);
$\dot{x}^n$=Velocity in the True North direction (meters/second);
$\dot{x}^u$=Velocity in the Up direction (meters/second);

$$\ddot{\vec{x}}_{t-1}^G$$

The acceleration computed from GPS velocities that was valid from time t−2 to time t−1;
$\overline{x}$ The raw GPS position;

$$\dot{\vec{x}}_t^O$$

The speed computed from the number of odometer counts that occurred from time t−1 to time t; and $$\ddot{\vec{x}}_t^A$$

The acceleration computed from the accelerometers which occurred from time t−1 to time t.
The following other information is available for use at time t, but was collected at a previous time:

$$\dot{\vec{x}}_{t-2}^G$$

The velocity from GPS which was valid two time units ago;

$$\vec{x}_{t-1}$$

The position computed at the previous time;

$$\ddot{\vec{x}}_{t-1}^A$$

The acceleration, computed from the accelerometers, from time t−2 to time t−1; and $$\dot{\vec{x}}_{t-1}^O$$

The velocity computed from the odometer counts from time t−2 to time t−1.
When GPS is available and has produced a valid position and velocity solution, the following equation will be used for the propagation of the vehicle position:

$$\vec{x}_t = \vec{x}_{t-1} + \int_{t-1}^{t} \dot{\vec{x}} dt + \int_{t-1}^{t} \left( \int_{t-1}^{t} \ddot{\vec{x}} dt \right) dt \text{ or}$$

$$\vec{x}_t = \vec{x}_{t-1} + \left( \dot{\vec{x}}_{t-1}^G * \Delta t \right) + \left( \frac{1}{2} \ddot{\vec{x}}_t^A * (\Delta t)^2 \right) + \left( \left( \frac{1}{2} \ddot{\vec{x}}_{t-1}^G * (\Delta t)^2 \right) - \left( \frac{1}{2} \ddot{\vec{x}}_{t-1}^A * (\Delta t)^2 \right) \right)$$

This equation is: the current position is equal to the previous position plus the GPS velocity (vector) times the delta time plus the GPS acceleration from two time periods ago minus the Accelerometer acceleration from two time periods ago (a correction factor) plus the Accelerometer acceleration from the current second. In certain embodiments, other sensor information, such as the odometer information, can be used in the above equations if it is determined to be more appropriate than the accelerometer information.
Also computed at this second are:
(1) the GPS heading θ computed as the inverse tangent of the East and North velocities:

$$\theta = \operatorname{atan}\left( \frac{\dot{x}^e}{\dot{x}^n} \right);$$

(2) the distance from time t−1 to time t, computed from the GPS velocity valid at time t−1 and the double integration of the longitudinal Accelerometer acceleration from time t−1 to time t:

$$s = \sqrt{(\dot{x}_{t-1}^e * \Delta t)^2 + (\dot{x}_{t-1}^n * \Delta t)^2} + \frac{1}{2} \ddot{x}_t^A * (\Delta t)^2;$$

(3) the distance from time t−2 to time t−1, computed from the GPS velocity and acceleration from time t−2 to time t−1. This will be used as a calibration factor for both the Vehicle Speed Sensor and the Longitudinal accelerometer:

$$s = \sqrt{(\dot{x}_{t-2}^e * \Delta t)^2 + (\dot{x}_{t-2}^n * \Delta t)^2} + \frac{1}{2} \ddot{x}_{t-1}^G * (\Delta t)^2;$$

(4) the change in heading from time t−2 to time t−1 from the GPS heading computed at those times. This is used as a correction factor for the lateral accelerometer.

$$\Delta \theta = \theta_{t-2}^G - \theta_{t-1}^G$$

To maintain the system accuracy when GPS velocity information is not available, each sensor needs to have calibrations performed on it. The calibrations will be performed using known good data from the GPS receiver 18. The GPS receiver 18 has velocity accuracy to within one meter per second. The GPS velocity information becomes less accurate in low velocity states of less than 1.5 m/s. The GPS velocity information is time tagged so that it matches a particular set of odometer and accelerometer data on a per second basis. Map matching provides correction factors, but they are based on long term trends and not directly associated with any specify time interval. Sensor calibration using the GPS velocities will involve the following sensors in this particular embodiment.

Odometer (Vehicle Speed Sensor) Calibration. The odometer output is the number of ticks of a counter, with a specified number of ticks to be equal to one unit of linear distance traversed. An example is that the GM Vehicle Speed Sensor has 4000 pulses per mile. This will have a default value from the factory and a calibrated value stored in FLASH thereafter. The odometer will be calibrated once per second from the GPS velocity and acceleration that occurred over that same time period, when valid GPS data is available.

Lateral Accelerometer. The lateral accelerometer measures centripetal acceleration. It is used to compute turn angle from the equation: Turn angle in radians is equal to the quotient of centripetal acceleration and tangential velocity. The Lateral accelerometer has two values which need to be calibrated: The zero offset and the scale factor. The zero offset is the measurement that the accelerometer outputs when a no acceleration state exists. The scale factor is the number that is multiplied by the difference between the accelerometer read value and the accelerometer zero offset to compute the number of G's of acceleration. The first derivative of the GPS velocities will be used to compute the scale factor calibration. The zero motion detect system which is discussed in FIGS. 4a and 4b will be used to compute the accelerometer zero offset value.

Longitudinal Accelerometer. The longitudinal accelerometer measures the acceleration along the nose/tail axis of the vehicle, with a positive acceleration being out the nose (forward) and a negative acceleration being out the rear of the vehicle. The Longitudinal accelerometer has two values which need to be calibrated: The zero offset and the scale factor. The zero offset is the measurement that the accelerometer outputs when an no acceleration state exists. The scale factor is the number that is multiplied by the difference between the accelerometer read value and the accelerometer zero offset to compute the number of G's of acceleration. The first derivative of the GPS velocities will be used to compute the scale factor calibration. The zero motion detect system shown in FIGS. 4a and 4b will be used to compute the accelerometer zero offset value.

Figure 4A:
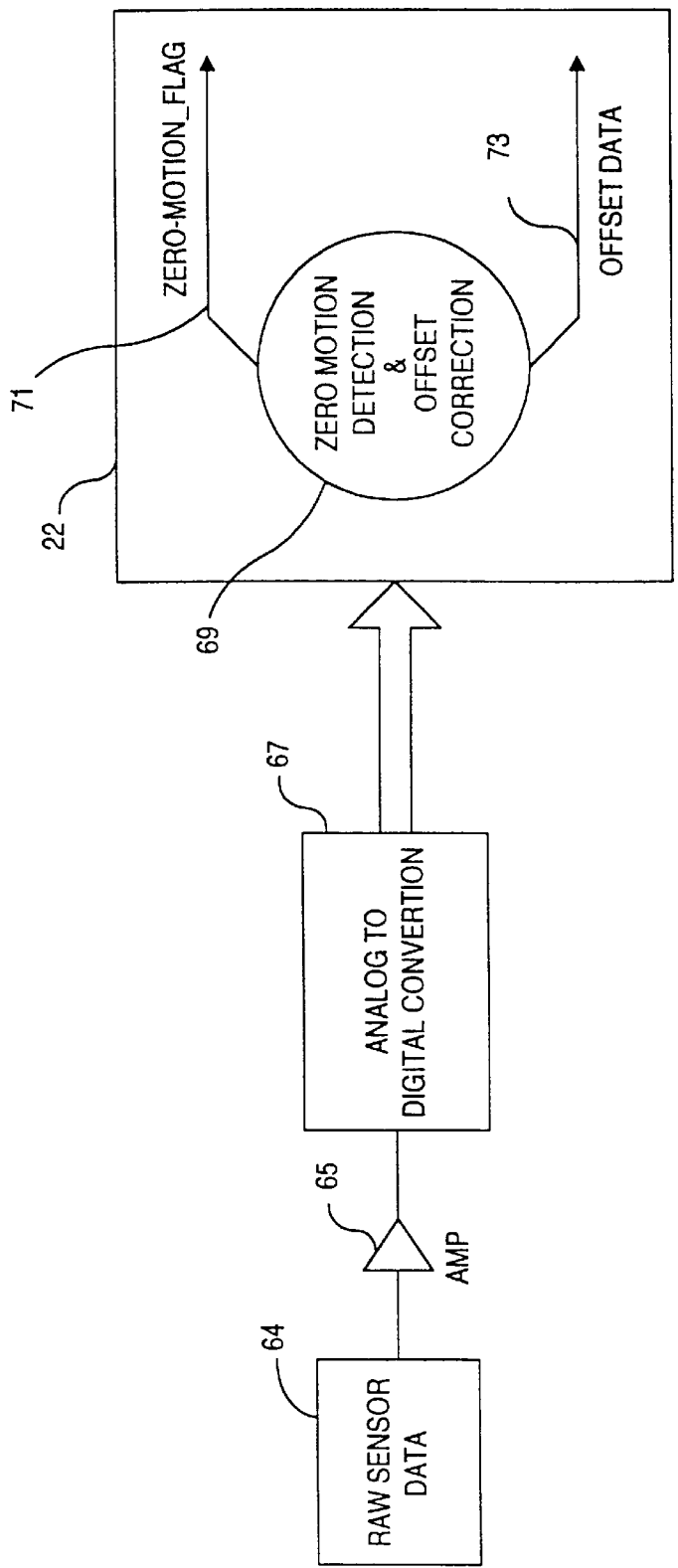
FIG. 4a shows a block diagram of a zero motion detect system according to the principles of the present invention.

FIG. 4a shows the zero motion detect system with a motion sensor 64 (an orthogonal axes accelerometer in this embodiment) providing motion signals with an offset. An amplifier 65 amplifies the motion signals, and in this particular embodiment, the motion signals are digitized in an analog to digital converter 67. The motion signals are provided to a zero motion detection and offset calculation block 69 which is in the application unit 22 (FIG. 2). The vehicle navigation system determines a zero motion state by comparing samples of the motion signals from the motion sensor 64, such as an accelerometer, a gyro, or piezoelectric sensors with a threshold (the threshold is determined by vehicle vibration characteristics for the type of vehicle that the unit is mounted in, or the threshold for motion sensor could be set using other sensors which suggest zero motion, such as odometer, GPS or DGPS). The vehicle navigation system uses at least one of the samples to determine the zero offsets if the zero motion state is detected. At least two samples are preferred to compare over a time interval and averaging those samples to obtain a zero offset for the motion sensor 64. If a zero motion state exists, the vehicle navigation system sets a zero motion flag 71 and uses at least one of the samples to determine the zero offset for the sensor providing the processed motion signals.

The system also provides offset data signals 73 which reflect the zero offset for the sensor providing the motion signals or the raw data used to calculate the zero offset. Upon detecting a zero motion state, the vehicle navigation system can resolve ambiguity of low velocity GPS measurements because the velocity is zero. GPS velocities do not go to zero, so ambiguities exist when in a low velocity state of less than 1.5 m/s. If a zero motion flag is on, then the ambiguities are resolved because the system is not moving. As such, the system freezes the heading and can also set the speed component of velocity to zero.

The following high level language program shows the operation of this particular embodiment of the zero motion detect system.

```
NUMSAMPLES = 16 (in filter array)
WORD    DATA[NUMSAMPLES–1]
WORD    NOISE
FOR (I=0; I < NUMSAMPLES; I++)
    NOISE = NOISE + | DATA[I] – DATA[I+1]|
If (NOISE > THRESHOLD)
    ZERO_MOTION_FLAG = 0
ELSE
    ZERO_MOTION_FLAG = 1.
```

Figure 4B:
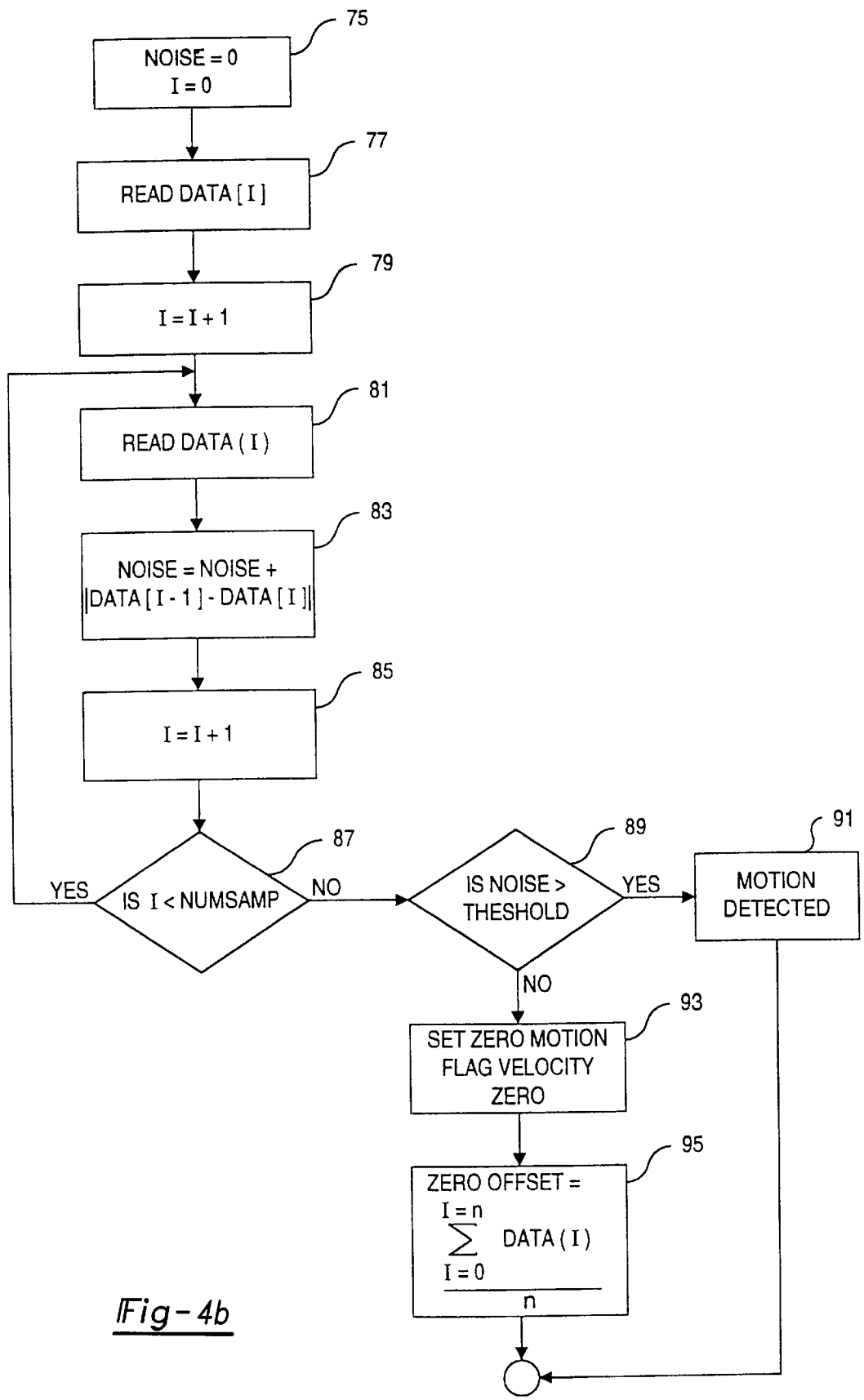

FIG. 4b shows a flowchart of a variation of the zero motion detect system. At step 75, the system intializes the variables I and NOISE to zero, and at step 77, the first value of the array is read. The counter I is incremented at step 79, and the system reads the next sample at step 81. At step 83, the system begins to accumulate the differences between consecutive samples of the motion signals. The system loops through steps 81–87 until all the samples have been read and the difference between consecutive samples accumulated in the variable NOISE. Once all the samples have been read, the system compares the variable NOISE with the threshold value at step 89. If the NOISE variable is greater than the threshold, then the system determines that motion has been detected in step 91. If the NOISE variable is less than the threshold, the system sets the zero motion flag and determines that the velocity is zero at step 93. The setting of the zero motion flag can set distance changes to zero, lock the heading and current position. Additionally, at step 95, the system calculates the zero offset for the sensor being sampled.

With regard to FIG. 4b and the high level program above, the system is described as sampling the motion signals from one sensor 64, such as one axis of the orthogonal axes accelerometer. In this particular embodiment, the motion signals for each of the orthogonal axes of the accelerometer is sampled and zero offsets for each is determined. Furthermore, zero offsets, sensor calibration or resolving of ambiguities can be accomplished for other sensors using the zero motion detection system according to the principles of the present invention.

Figure 5A:
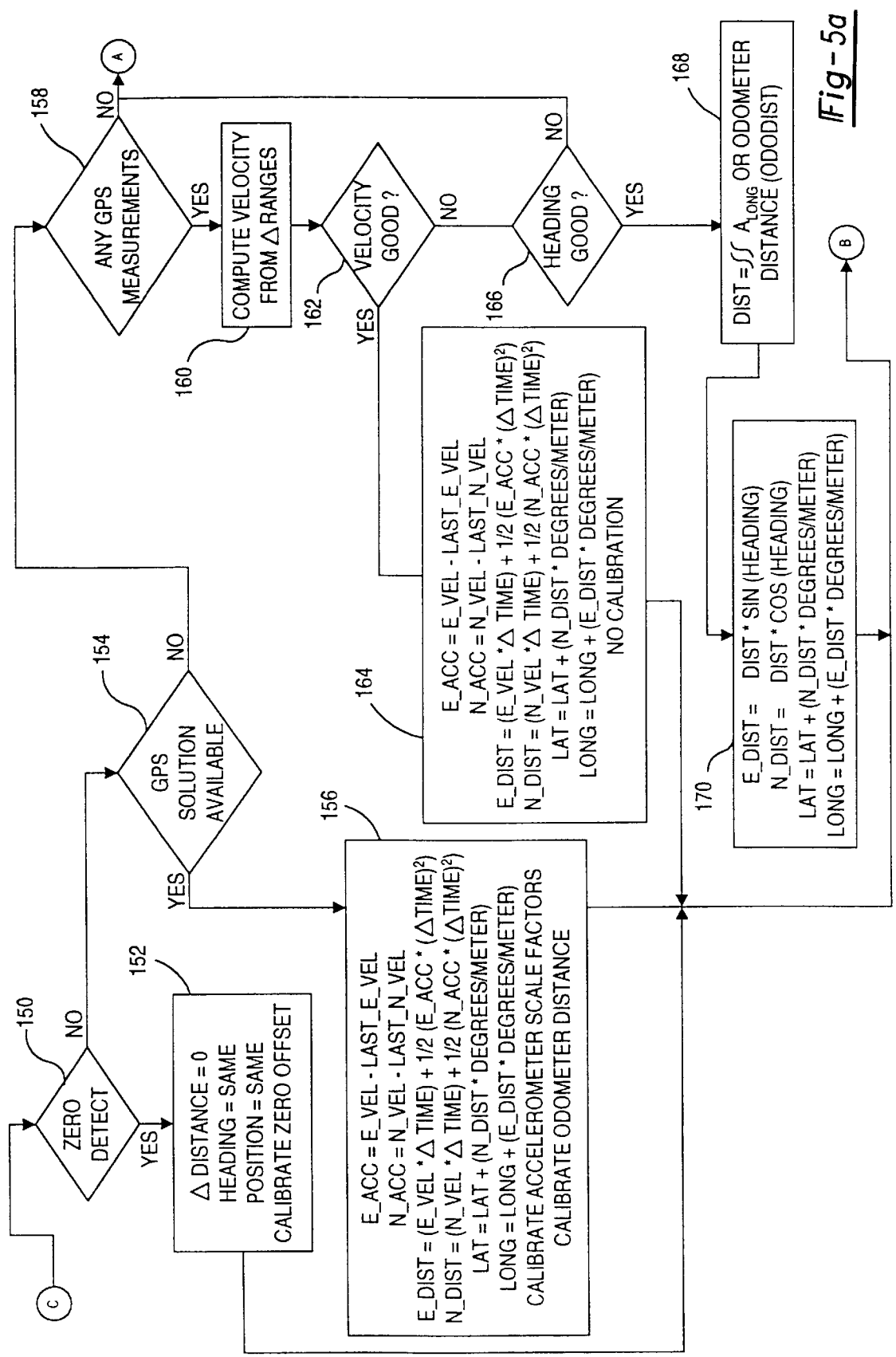
FIGS. 5a and 5b show a general flow chart of the operation of certain embodiments of the improved vehicle navigation system of FIG. 2.
Figure 5B:
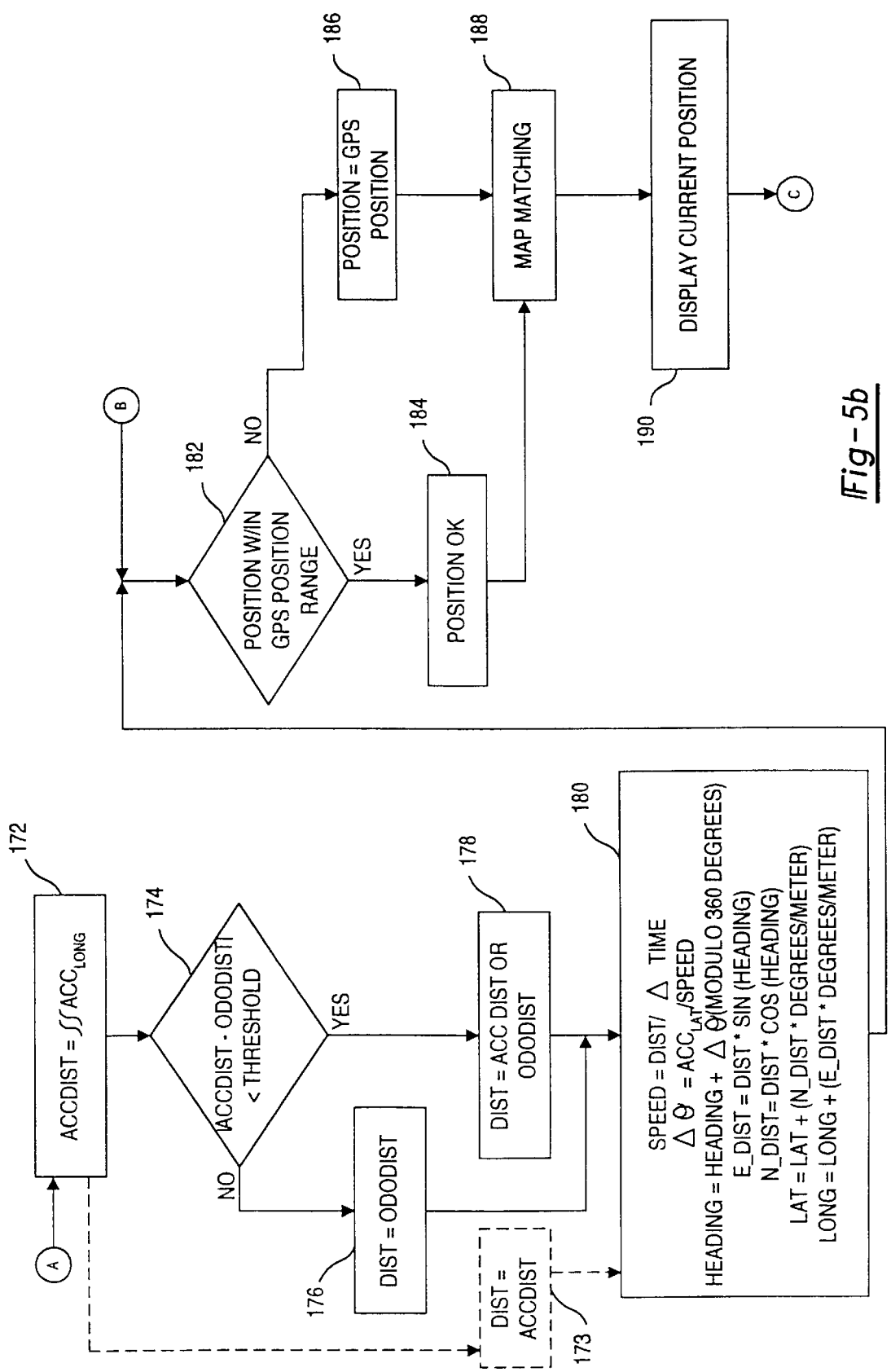

FIGS. 5a and 5b show a general flowchart illustrating how the improved vehicle navigation system 10 propagates a previous position to a current position. At step 150, the improved vehicle navigation system determines if the vehicle is in a zero motion state as described above. If so, the system, at step 152, sets the change in distance to zero, locks the heading and current position, and calibrates the zero offsets.

If the system determines that the vehicle is moving, the system proceeds to step 154 to determine if a GPS solution is available. If GPS is available, the system uses the GPS velocity information to determine the current position. As shown in step 156, the system calculates a east and north accelerations as follows:

$$e\text{-}acc = e\text{-}vel\text{-}last.e\text{-}vel \quad (1)$$

$$n\text{-}acc = n\text{-}vel\text{-}last.n\text{-}vel \quad (2).$$

The accelerations are used to calculate east and north displacements as follows:

$$e\text{-}dist = (e\text{-}vel*\Delta t) + \tfrac{1}{2}(e\text{-}acc*(\Delta t)^2) \quad (3)$$

$$n\text{-}dist = (n\text{-}vel*\Delta t) + \tfrac{1}{2}(n\text{-}acc*(\Delta t)^2) \quad (4).$$

The current position is calculated as follows:

$$lat = lat + (n\text{-}dist*degrees/meter) \quad (5)$$

$$long = long + (e\text{-}dist*degrees/meter) \quad (6),$$

where degrees/meter represents a conversion factor of meters to degrees, taking into consideration the shrinking number of meters in a degree of longitude as the distance from the Equator increases. Finally, at step 156, the system calibrates the sensor items, such as the accelerometer scale factors and the odometer distance using information from the equations described above. The system can keep the sensors well calibrated because calibrating can occur once per second (scale factors) if the vehicle speed is above 1.5 m/s. The use of GPS velocities for position propagation in a vehicle navigation system is described in U.S. patent application Ser. No. XX/XXX,XXX, entitled "Improved Vehicle Navigation System And Method Using GPS Velocities" and filed concurrently with this application.

If a full GPS solution is not available at step 154, the system checks at step 158 whether any GPS measurements are available. If so, the system computes the velocity information from the available subset of delta range measurements at step 160. If, at step 162, the velocity information is good, the system calculates current position using the equations 1–6 at step 64 but without calibrating the acceleration scale factors and the odometer distance in this embodiment. If the GPS velocity is determined not to be good at step 162, the system checks the heading component of the GPS velocity at step 166. If the GPS heading component is determined to be valid, then at step 168, the change in distance is set with the odometer distance, and the heading is set with the GPS heading calculated from the GPS delta range measurements. Alternatively, an odometer is not used, and the distance is derived from the longitudinal acceleration information. With this heading and distance, the system calculates a position (lat, long) at step 170 using the equations as follows:

$$e\text{-}dist = \Delta Dist * \sin(heading) \quad (7)$$

$$n\text{-}dist = \Delta Dist * \cos(heading) \quad (8).$$

After calculating the east and north distances, the system determines the vehicle position using equations 5 and 6, but calibration is not performed at this point in this embodiment.

If the system determines at step 166 that the GPS heading is not valid (GPS blockage or low velocity) or at step 158 that the GPS measurements are insufficient, the system falls back on the orthogonal axes accelerometer(s) and the odometer in this particular embodiment. GPS velocity information is subject to errors at speeds of less than 1.5 m/s, unless using a more accurate GPS system. For example, in a vehicle navigation system using DGPS, the threshold velocity is lower because of the higher accuracy of the system. As such, the vehicle navigation system proceeds to step 172 to determine the change in distance using lateral and longitudinal acceleration information from the orthogonal axes accelerometer(s). At step 174, the system compares the longitudinal distance from the accelerometer with the odometer distance, and if the difference between them exceeds a threshold value, the odometer distance is used at step 176. If the difference is less than the threshold, then the accelerometer distance or the odometer distance can be used for the distance at step 178. As shown in dashed step 173, if an odometer is not used, the distance is derived from the longitudinal acceleration information. Once the change in distance is determined, the system calculates the position at step 180 using the following equations to determine heading as follows:

$$speed = \Delta Dist / \Delta t \quad (9)$$

$$\Delta\theta = a_{lat} \text{ (lateral acceleration)/longitudinal speed} \quad (10)$$

$$heading = heading + \Delta\theta \text{ (modulo } 360°) \quad (11).$$

After determining heading, the system uses equations 7 and 8 to determine the east and north distances and equations 5 and 6 to determine position.

The use of multiple, orthogonal axes acceleration information to propagate a vehicle position from a previous position to a current position is described in more detail in copending U.S. patent application Ser. No. XX/XXX,XXX, entitled "Improved Vehicle Navigation System And Method Using A Multiple Axes Accelerometer" and filed concurrently with this application.

After determining the initial current position at step 156, 164, 170 or 180, the system proceeds to step 182 where the current position is compared with the GPS position. If the current position is within an acceptable distance (within 100 m for example) from the GPS position, the system determines that the current position is valid at step 184. If not, the system replaces the current position with the GPS position at step 186. At this point, the system sends to a map matching step 188 a position and velocity, which has speed and heading components. Depending on the configuration of the map database 30, other information can be sent to the map matching block 188, such as heading and distance based on the current and previous positions, a current position and figures of merit (FOM) for each.

The map matching block 188 sends back a map matched current position, distance, heading, FOMs for each and calibration data. In this embodiment, the map matching block 188 interrogates the map database 30 (FIG. 2) to obtain a heading of the mapped path segment which the vehicle is determined to be traversing. The map matching block 188 updates the heading associated with the current position, which was based on GPS and/or sensor calculations, to obtain an updated current position. As such, the map matching block 188 uses the map heading to update the heading based on the GPS velocity information, the heading based on the GPS position information of step 186, the heading from the sensors, or the heading based on a current position determined through a combination of GPS and sensor information, such as an embodiment with all raw inputs going into a Kalman filter.

Figure 6A:
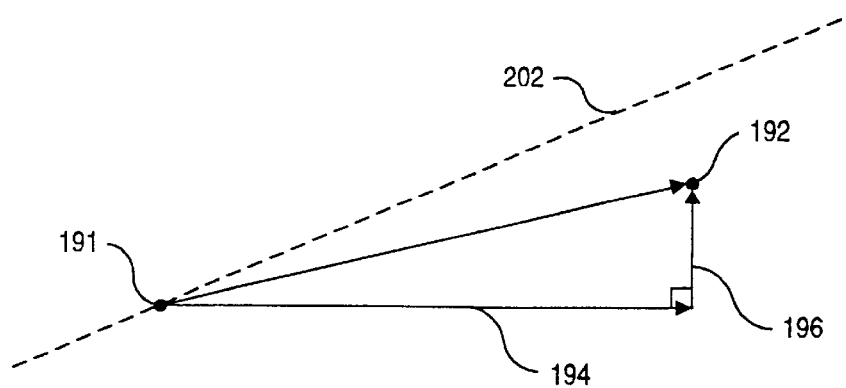
FIGS. 6a–6d show general diagrams illustrating how the improved vehicle navigation system updates the heading information with the map heading for position propagations.
Figure 6B:
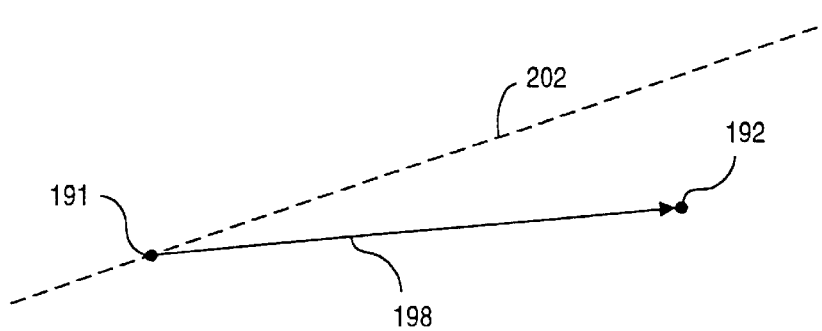
Figure 6C:
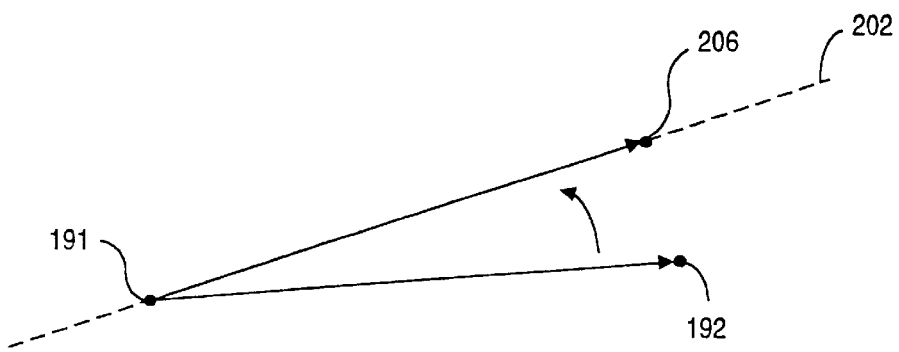
Figure 6D:
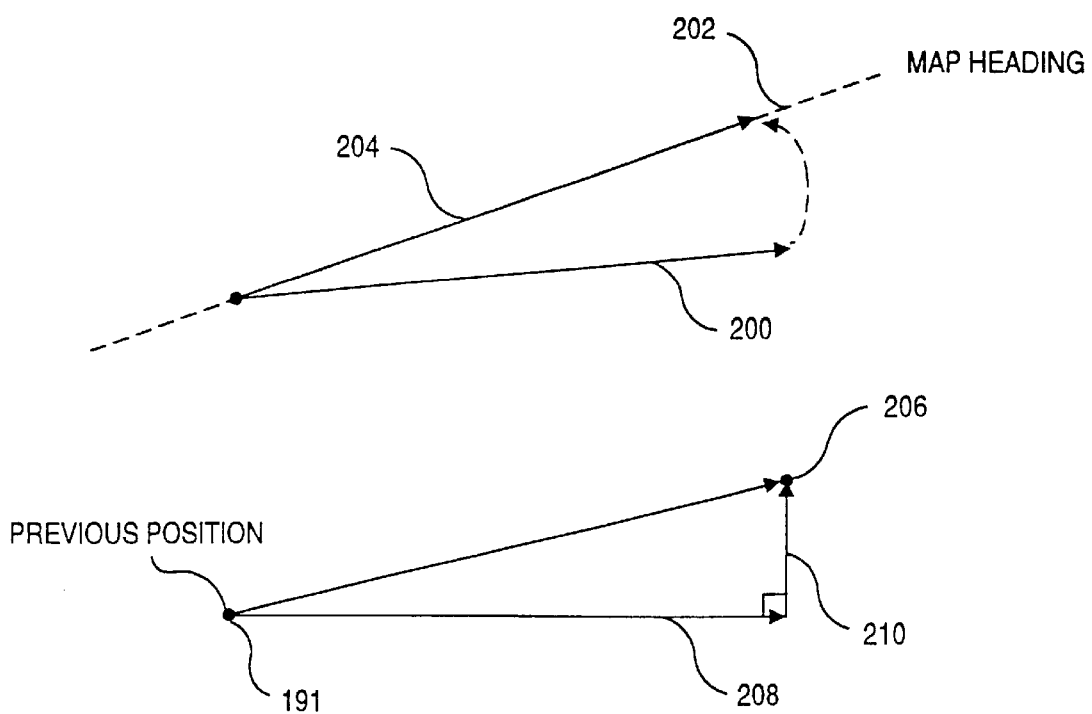

As shown in FIG. 6a, the vehicle navigation system 10 uses GPS velocity information to propagate a previous position 191 to a current position 192 (by adding displacements 194 and 196 obtained from the velocity information (integrated) to the previous position). In FIG. 6b, if GPS information is not available, the vehicle navigation system uses sensor information to propagate the previous position 191 to current position 192 using heading and distance 198. If the difference between the GPS heading (or current heading from the sensors if GPS is not used) and the map heading is within a threshold, then the map heading is used as the heading for position propagation. The vehicle navigation system 10 can accomplish this in alternative ways. For example, as shown in FIG. 6c using GPS velocities, the vehicle navigation system 10 rotates the GPS velocity vector 200 to align with the map heading 202 if the GPS and map headings are within the threshold and integrates the rotated GPS velocity vector 204 to obtain the displacements 208 and 210. As shown, the updated current position 206 is obtained by applying orthogonal displacements 208 and 210 to the previous position 191. In FIG. 6d, if the vehicle navigation system uses sensor information to propagate the previous position 191 to current position 192 using heading and distance 198, the map heading 202 can be used as the heading for position propagation to the updated current position 206. The use of map heading to update the information obtained from the non-GPS sensors or a combination of GPS and other sensors can be accomplished in a similar manner as would be understood by one of skill in the art. Depending on the information available and the particular embodiment, the improved vehicle navigation system can react differently to the information provided by the map matching block 188.

Thus, the improved vehicle navigation system provides several significant advantages, such as flexibility, modularity, and accuracy at a cheaper cost because updating can be performed at a complete stop. The principles of the present invention, which have been disclosed by way of the above examples and discussion, can be implemented using various navigation system configurations and sensors. The improved vehicle navigation system, for instance, can be implemented without using an odometer connection and obtaining distance information from the accelerometer inputs when GPS is not available to improve portability and installation costs. Moreover, the improved vehicle navigation system can obtain dead reckoning information from GPS signals when a full set of GPS measurements is available, and use its sensors when anything less than a full set of GPS signals is available. Those skilled in the art will readily recognize that these and various other modifications and changes may be made to the present invention without strictly following the exemplary application illustrated and described herein and without departing from the true spirit and scope of the present invention, which is set forth in the following claims.

We claim:

1. A vehicle navigation system having an improved zero motion detection system comprising:

a motion detection sensor which provides motion signals with an offset;

said zero motion detection system compares at least one sample of said motion signals with a threshold to determine a zero motion state, said zero motion detection system determining said zero motion state if said at least one sample is less than said threshold, and if in said zero motion state, said detection system determines said offset;

said navigation system propagates a previous position to a current position based upon a non-zero velocity signal when said zero motion state is not determined, said navigation system ignoring said non-zero velocity signal and locking a previously determined position based upon said determination of said zero motion state.

2. The system of claim 1 wherein said velocity signal comprises said motion signals.

3. The system of claim 1 wherein said velocity signal comprises a GPS velocity signal.

4. The system of claim 1 wherein said navigation system propagates a previous position to a current position utilizing GPS velocities when said zero motion state is not determined, said detection system resolving ambiguity in GPS velocity information when said zero motion state is determined.

5. The system of claim 1 wherein said motion detection sensor provides said motion signals in a first axis, said navigation system locking changes in said first axis based upon said determination of said zero motion state.

6. The system of claim 1 including a zero motion signal, said detection system produces a zero motion signal to lock beading changes and calibrate velocity information based upon said determination of said zero motion state.

7. The system of claim 1 wherein said detection system determines said offset by averaging samples of said motion signals.

8. The system of claim 1 wherein said detection system compares at least two samples of said motion signals with a threshold to determine said zero motion state.

9. The system of claim 1 wherein said motion detection sensor includes an orthogonal axes accelerometer, said system determines a zero offset for at least one axes of said accelerometer if said detection system is in said zero motion state.

10. A vehicle navigation system having an improved zero motion detection system comprising:

a motion detection sensor which provides motion signals with an offset, wherein said motion detection sensor is an orthogonal axes accelerometer which provides motion signals with an offset for each axis of said accelerometer;

said zero motion detection system compares at least one sample of said motion signals with a threshold to determine a zero motion state, and if in said zero motion state, said detection system determines said offset; and said navigation system propagates a previous position to a current position based upon a non-zero velocity signal when said zero motion state is not determined, said navigation system ignoring said non-zero velocity signal and locking a previously determined position based upon said determination of said zero motion state, said zero motion detection system compares at least two samples of said motion signals with a threshold to determine said zero motion state, and if in said zero motion state, said detection system determines a zero offset for each axis of said accelerometer by averaging samples of said motion signals for each axis, and said zero motion detection system provides a zero motion signal to lock heading changes and calibrate velocity information.

11. A method of detecting a zero motion state, said method comprising the steps of:

providing a motion sensor signal having an offset, determining a zero motion state by comparing at least one sample of said motion sensor signal with a threshold;

using at least one of said samples to determine said offset if said zero motion state is detected; and locking a previously determined position based upon said determining of said zero motion state.

12. The method of claim 11 further including the step of providing a zero motion signal upon detecting a zero motion state to resolve ambiguity of GPS velocity measurements.

13. The method of claim 11 further including the step of:

providing a zero motion signal; and locking heading changes and calibrating velocity information in response to said zero motion signal.

14. The method of claim 11 wherein said step of determining said zero motion state includes comparing at least two samples of said motion signals with said threshold to determine said zero motion state.

15. The method of claim 11 wherein said step of using includes the step of averaging said samples.

16. The method of claim 11 wherein said step of providing motion signals includes employing an orthogonal axes accelerometer which provides motion signals and an offset for at least one axis of said accelerometer.

17. A method of detecting a zero motion state, said method including the steps of:

providing a motion sensor signal having an offset;

determining a zero motion state by comparing at least one sample of said motion sensor signal with a threshold;

using at least one of said samples to determine said offset if said zero motion state is detected; and locking a previously determined position based upon said determining of said zero motion state;

providing said motion sensor signal and said offset for at least one axis of an orthogonal axes accelerometer;

determining said zero motion state by comparing at least two samples of said motion sensor signal with said threshold;

providing a zero motion signal based upon said determining said zero motion state;

locking heading changes and calibrating velocity information in response to said zero motion signal; and averaging said samples to determine said offset if said zero motion state is detected.

* * * * *

UNITED STATES PATENT AND TRADEMARK OFFICE
CERTIFICATE OF CORRECTION

PATENT NO. : 5,991,692
DATED : November 23, 1999
INVENTOR(S) : Spencer et al.

It is certified that error appears in the above-identified patent and that said Letters Patent is hereby corrected as shown below:

<u>Title page,</u>
Item [57], the ABSTRACT has been replaced with the following:

-- The improved vehicle navigation system can take advantage of the recent availability of low cost micro-machined and piezoelectric sensors, and partially overcomes the low dynamics and line of sight limitations of GPS receivers without resorting to the hard wired approach described above. The low cost sensors introduce system level errors due to their inherent DC offset and drift rates. The improved vehicle navigation system minimizes both the sensor induced errors and GPS low dynamic limitations by using a zero motion detection system as a self contained (within the navigation system), vehicle independent device. --

<u>Column 14,</u>
Line 32, the word "beading" has been replaced with -- heading --.

Signed and Sealed this

Twenty-first Day of January, 2003

JAMES E. ROGAN
*Director of the United States Patent and Trademark Office*